June 12, 1928.  J. T. RIDDELL  1,672,905
FLUID SEAL AIR VALVE
Filed Feb. 7, 1927

Witnesses:
E. E. Wessels
J. C. Appleton

Inventor:
John T. Riddell,
By Joshua R. H. Potts.
his Attorney.

Patented June 12, 1928.

1,672,905

UNITED STATES PATENT OFFICE.

JOHN T. RIDDELL, OF EVANSTON, ILLINOIS.

FLUID-SEAL AIR VALVE.

Application filed February 7, 1927. Serial No. 166,375.

My invention relates to an air valve and more particularly to a fluid seal air valve.

The object of my invention is to provide an air valve of the above indicated character which may be used in any place where it is desired to retain air in an inflated device, such as a basket ball, bicycle tire, air cushions and the like, where it has been customary heretofore to use the usual type of mechanical valve.

Another object of my invention is to provide a valve of the above indicated type, the outer end of which is adapted to lay flat with the surface of the inflated article, and has no metal parts, but presents a soft rubber surface to whatever it may come in contact with; said surface having excellent wearing qualities, and adapted to last indefinitely without the necessity of replacement.

Another object of my invention is to provide a valve of the above indicated character which consists of a soft rubber plug or capsule having therein a puncture healing fluid or semi-fluid material; said capsule adapted to be punctured all the way through by an inflating device and the fluid adapted to heal said puncture when the inflating device is withdrawn therefrom and thereby prevent air returning through the valve.

My invention will be best understood by reference to the accompanying drawing forming a part of this specification and in which.

Figure 1:
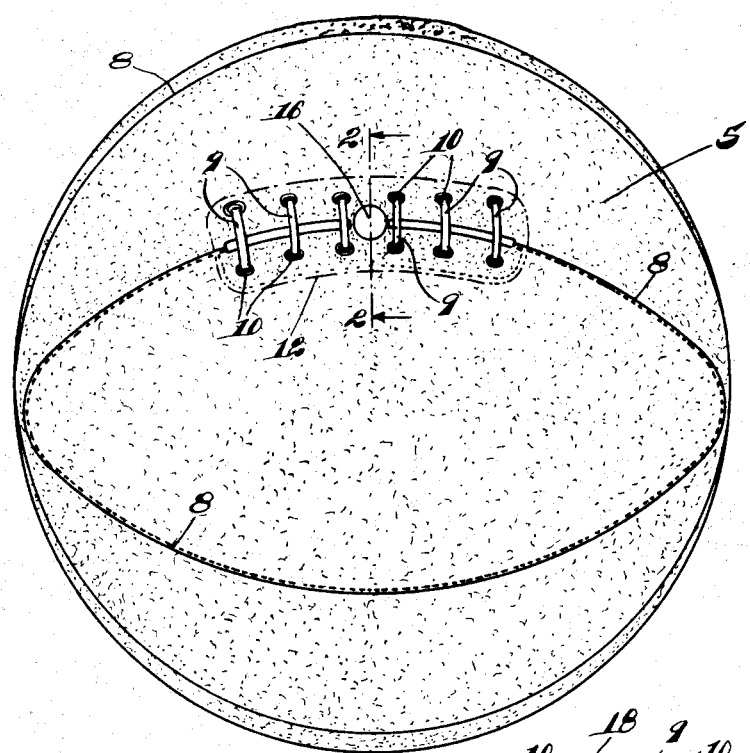
Figure 1 is a plan view of a basket ball having my invention applied thereto.

In the drawings I have shown the preferred form of my invention. Numeral 5 designates a basket ball having the usual type of cover 6 and rubber bladder 7. The leather covering is made up of several sections, sewed together along seams 8 and provided with an opening through which the bladder may be inserted or withdrawn. The sides of said opening are laced together as shown in Figure 1 by suitable lacing strings 9 secured through holes 10 in the leather covering in both sides of the opening. Under the laced opening is provided a flap 11 secured to the leather covering 6 by stitching at 12 along one side of said flap, which is held between the covering and the bladder by air pressure from within said bladder.

Permanently secured to the bladder 7 by vulcanizing or other suitable means is a reenforcing member 13, being circular in form and having an increased thickness in the middle and tapering to a very thin edge. Through this member 13 and the portion of the bladder to which it is secured, is provided a round hole 14 through which is inserted a hollow cylindrical plug or capsule 15 of soft rubber material which is securely cemented in place. The hollow 16 in said plug is filled with a fluid or semi-fluid plastic substance 17, such as rubber cement or uncured rubber which is adapted to flow or to be deformed when subjected to air pressure and thereby prevent air from passing through the same.

On the outer end of the hollow plug 16, constituting the air valve is a flange 18 of soft rubber, which is fitted snugly in a round recess in the covering 6, thus presenting a non-metallic wearing surface flush with the surface of the ball.

Figures 2, 3:
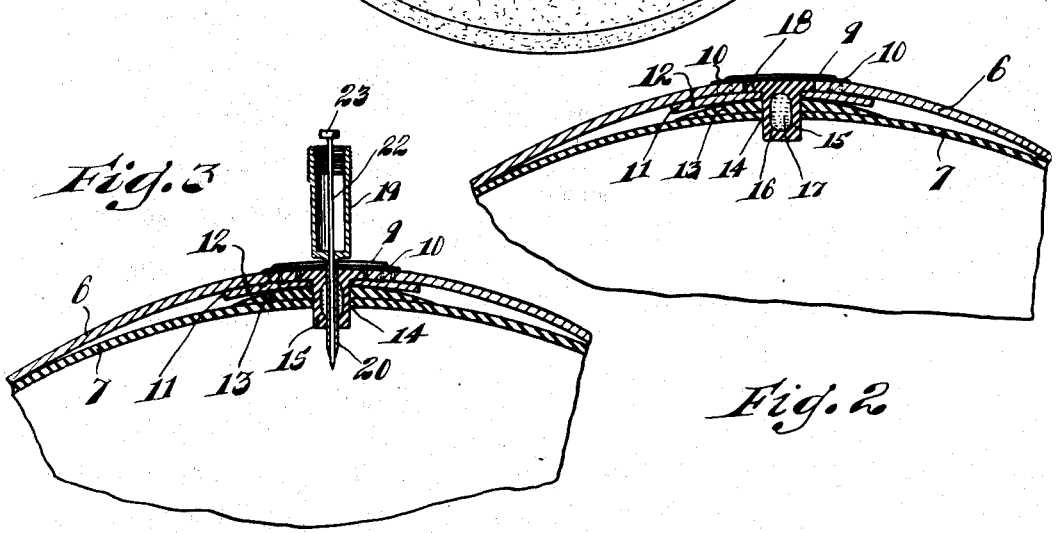
Figure 2 is a fragmental cross section taken on line 2—2 of Figure 1.
Figure 3 is a view similar to Figure 2 and showing the device for puncturing the fluid valve for the purpose of inflating the ball and, Figure 4 is a view similar to Figures 2 and 3 and showing the needle removed from the inflating means, and a Schrader valve inserted for aiding the inflation of the ball in case the supply of air pressure is intermittent.
Figure 4:
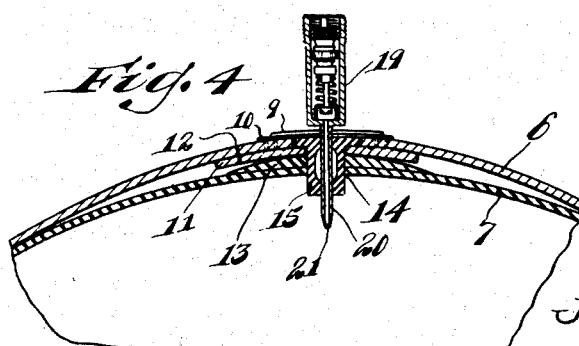

In Figure 3 is shown a valve casing 19 having an extension 20 with an air passage 21 therethrough. A needle 22 having a head 23 is adapted to be forced down through the air passage of said extension 20 for piercing the hollow plug or air valve 16 and adapted to pilot the member 20 through the rupture created by the needle. After the portion 20 has been inserted through the air valve 16 the needle 23 may be removed and any suitable type of valve 24 may be screwed into the valve casing 19 and the ball inflated by air pressure from any suitable source of air pressure supply in the usual way. After the bladder is properly inflated the valve casing with its extension is withdrawn and the fluid or plastic material 17 seals up the rupture, thereby preventing the escape of air from the bladder.

In Figure 1 it will be noted that the valve 16 is at all times unobstructed and the ball may be inflated without the necessity of unlacing the same, which is a great advantage over the old method, where it was always necessary to unlace the ball in order to inflate it.

While I have described my invention in its preferred form it will be understood that many variations may be made therein without departing from the spirit of the invention; I do not, therefore, wish to be limited to the precise details as described but desire to avail myself of such variations and modifications as come within the scope of the appended claims.

I claim as my invention:

1. In an article of manufacture, adapted to be inflated by pneumatic pressure; a hollow plug adapted to fit in a hole in said article and secured to said article; said hollow plug adapted to be punctured for the purpose of inflating said article; said plug containing a plastic material adapted to seal said puncture to prevent the passage of air therethrough.

2. In an article of manufacture, adapted to be inflated by pneumatic pressure; a valve consisting of a hollow plug of soft rubber filled with puncture healing material, and adapted to be punctured for the purpose of inflating said article; said puncture healing material adapted to heal said puncture and prevent the passage of air therethrough.

3. In an article of manufacture, adapted to be inflated by pneumatic pressure; a valve consisting of a hollow plug of soft rubber filled with puncture healing material, and adapted to be punctured for the purpose of inflating said article; said puncture healing material adapted to heal said puncture and prevent the passage of air therethrough; said valve being accessible from the outer surface of said article.

4. In an article of manufacture, adapted to be inflated by pneumatic pressure; a valve consisting of a hollow plug of soft rubber filled with puncture healing material, and adapted to be punctured for the purpose of inflating said article; said puncture healing material adapted to prevent the passage of air therethrough; said valve having a flange of soft rubber forming a part of the surface of said article.

5. In an article of manufacture, adapted to be inflated by pneumatic pressure; a valve consisting of a hollow plug of soft rubber filled with puncture healing material, and adapted to be punctured for the purpose of inflating said article; said puncture healing material adapted to prevent the passage of air therethrough; the outer end of said valve extending into a recess in the outer surface of said article and forming a part of said surface; the inner end of said valve extending into the inflated portion of said article.

6. In an article of manufacture, having an elastic air container, and adapted to be inflated by air pressure; a valve in said air container consisting of a soft rubber plug secured to said air container and extending inwardly through the same; said plug having a hollow therein containing plastic puncture healing material; said valve adapted to have inflating means inserted through said valve, for inflating said article; said puncture healing material adapted to prevent the passage of air through the valve when said inflating means is withdrawn; said valve having a flange and an outer surface forming a portion of the outer surface of said article and being always accessible for the purpose of inflating said article.

In testimony whereof I have signed my name to this specification.

JOHN T. RIDDELL.